United States Patent

Biondetti

[11] 4,241,482
[45] Dec. 30, 1980

[54] DEFLECTION COMPENSATING ROLL

[75] Inventor: Mario Biondetti, Schio, Italy

[73] Assignee: Escher Wyss Limited, Zurich, Switzerland

[21] Appl. No.: 880,609

[22] Filed: Feb. 23, 1978

[30] Foreign Application Priority Data

Feb. 23, 1977 [CH] Switzerland ............... 2234/77

[51] Int. Cl.³ .............................................. B21B 13/02
[52] U.S. Cl. .................................................. 29/116 AD
[58] Field of Search ........... 29/116 AD, 117, 113 AD

[56] References Cited
U.S. PATENT DOCUMENTS

| 3,802,044 | 4/1974 | Spillman et al. | 29/113 AD |
| 3,846,883 | 11/1974 | Biondetti | 29/116 AD |
| 3,885,283 | 5/1975 | Biondetti | 29/116 AD |
| 3,932,921 | 1/1976 | Biondetti | 29/116 AD |
| 4,068,360 | 1/1978 | Freuler | 29/116 AD |

Primary Examiner—Wayne L. Shedd
Attorney, Agent, or Firm—Pennie & Edmonds

[57] ABSTRACT

A deflection compensating press roll is disclosed in which a stationary axial support beam has a roll shell mounted for rotation thereabout and a plurality of hydrostatic support elements provide support along the length of the roll. The support elements include a support shoe having a bearing surface which cooperates with the inside of the roll shell and a piston joined to the support shoe which includes a cylindrical tube having generally constant inside and outside diameters.

21 Claims, 4 Drawing Figures

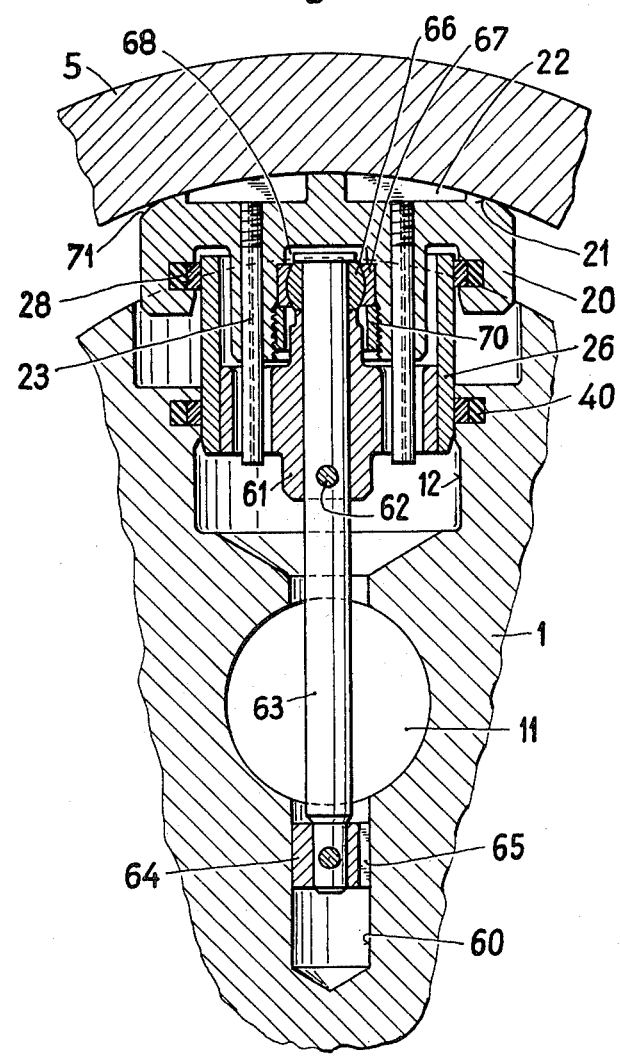

DEFLECTION COMPENSATING ROLL

BACKGROUND OF THE INVENTION

1. Field of the Invention

The invention relates to deflection compensating press rolls of the type having a stationary support beam and a roll shell for rotation thereabout. The shell is supported on a plurality of hydrostatic support elements, each of which has a support shoe with a bearing surface for support of the roller casing, as well as a piston-like piece which is sunk into a bore of the support beam and is sealingly connected with the swivel-mounted support shoe.

2. Description of the Prior Art

Deflection compensating rolls of this type, which are disclosed, for example, in U.S. Pat. Nos. 3,802,044 to Spillmann et al. and 3,846,883 to Biondetti, provide sag-free support by one roll of an opposing roll, wherein the roll shell of the support roll is independent of any sagging of the support beam of said roll in which the support elements are housed.

U.S. Pat. No. 3,846,883 discloses a hydrostatic support element which has a swivel-mounted support shoe connected to a piston-like member. The piston-like member has the form of a substantially solid roller. The conditions are selected such that there is a residual compressive force remaining between the support shoe and the piston-like member pressing the two parts together. The piston-like member therein is quite heavy, contains a great deal of material, and is very costly to produce, especially since it has surfaces which must be very finely machined.

SUMMARY OF THE INVENTION

The invention relates to a deflection compensating press roll which comprises a stationary axial support beam having a central bore extending therethrough and having a plurality of generally radially extending cylinders in communicating relation with the central bore, a roll shell rotatably disposed about said support beam for rotation thereabout, and a plurality of hydrostatic support elements positioned in engaged relation between the beam and the shell to exert forces therebetween. At least one of the support elements includes piston means including a generally tubular member disposed within the radially extending cylinder for transmitting fluidic pressure to support the shell, a support shoe positioned at the free end of the piston means and having a bearing surface which faces inner surface portions of the shell, and means for connecting the support shoe to the piston means to provide forces for supporting the shell.

The hydrostatic support element of the deflection compensating roll of the present invention comprises piston means which includes a cylindrical tube having generally constant inside and outside diameters. Preferably, the tube may engage in a recess in the support shoe and may be surrounded on the outside by a seal disposed between the support shoe and the tube. This arrangement provides the advantage that both the remote and free ends of the tube are exposed to essentially like hydraulic pressure. Thus, no net axial force acts on the tube. Accordingly, the tube may therefore be connected with the support shoe by relatively simple means.

A guide ring for permitting passage of the hydraulic pressure fluid may be provided between a surface of the support shoe and the inner wall of the tube. Centering of the tube on the support shoe is thereby accomplished by simple means, whereby the seal surrounding the outside of the tube is relieved.

The tube may also be provided with a ring-shaped projection at its end sunk in the cylinder bore of the beam remote from the support shoe. The diameter of the ring-shaped projection is greater than the outside diameter of the rest of the tube. A projection of this type, the outer diameter of which may be only a few tenths of a millimeter greater than the diameter of the rest of the tube, may be produced in simple fashion by regrinding the outer surface of the tube. The projection reduces the friction between the tube and the beam, in particular if the bore becomes deformed in case of sagging of the beam. In this manner, the desirability of the thin-walled tube, already favorable in comparison with a solid, piston-like member, is even further improved. Alternatively, there may be formed inside the cylinder bore within the tube a peripheral groove, within which a sealing ring is fitted. The roll is in this way quite distinctly simplified, since simple cylindrical bores in the beam suffice for admission of pistons.

Preferably, there may be provided a connecting rod for non-rigidly connecting the tube and the support shoe. The connecting rod is arranged in the axial region of the tube and the support shoe and is provided with pins disposed perpendicular to the longitudinal direction of the rod. One of the pins is passed through the tube and the other through a bore of the shoe. In this way, connection of the tube with the support shoe is accomplished in a simplified manner. It is to be understood, however, that other types of connection means may be alternatively utilized such as, for example, a chain or cooperating stops arranged on the support shoe and on the tube. Such stops are disclosed, for example, in U.S. Pat. No. 3,846,883.

Alternatively possible is an embodiment in which an axially disposed rod is rigidly fixed in the tube. The rod leads outward from the tube, away from the support shoe, and at its free end is carried slidingly in a bore, the diameter of which is smaller than the outer diameter of the tube. This arrangement provides a support element that is suitable for long strokes, axial movements in the bore in the beam. Accordingly, the beam is weakened less than a correspondingly long cylindrical tube carried in a bore matching its outside diameter.

In all of these embodiments the support shoe may be provided at its supporting surface with hydrostatic bearing pockets which are connected by throttling channels with the interior space of the tube similar to the arrangements disclosed, for example, in U.S. Pat. Nos. 3,802,044 and 3,846,883. In the present embodiment, hydrostatic, contact-free, lubrication is provided between the support shoe and the roll shell, whether or not the roll shell is rotating.

Accordingly, as will be seen from the description which follows, my invention relates to an improved development of a roll of the type disclosed in U.S. Pat. No. 3,846,883, particularly in that it provides a support element which is substantially simpler and less costly to produce, as well as having the further advantage of being adaptable to strokes of various lengths by replacement of simple parts.

It is to be noted that the bearing surface of the support shoe of the present invention may alternatively be designed in a simpler fashion wherein a hydrodynamic bearing surface obviates the need for the hydrostatic bearing pockets.

BRIEF DESCRIPTION OF THE DRAWINGS

Preferred embodiments of the invention are described hereinbelow with reference to the drawings wherein:

FIG. 4 illustrates another alternative embodiment of the hydrostatic support element of FIG. 2.

DETAILED DESCRIPTION OF THE PREFERRED EMBODIMENTS

Figure 1:
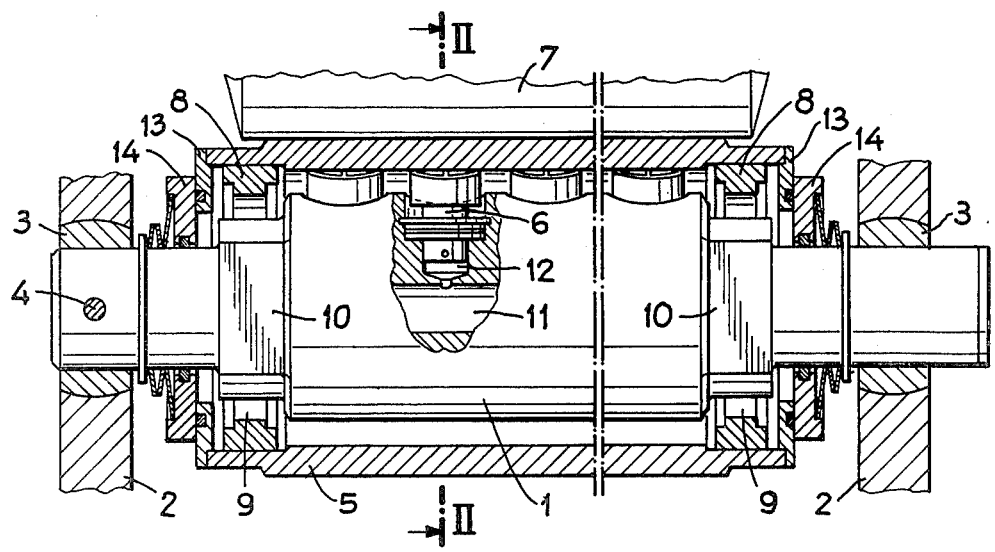
FIG. 1 is an axial cross sectional view of a deflection compensating press roll having hydrostatic support elements according to the invention.

In FIG. 1 there is shown a deflection compensating press roll having stationary beam 1 which is supported in a frame 2. Spherical bearing bushings 3 secured in the frame permit deflection of the ends of the beam while a pin 4 prevents rotation of the beam.

A roll shell 5 is rotatable about the beam 1. The roll shell 5 is supported on hydrostatic support elements 6 which press the shell against an opposing roll 7. Guide disks 8 having longitudinal apertures 9 are provided within the ends of the shell 5. The guide disks have parallel guide surfaces (not shown) which are guided along plane parallel guide surfaces 10 of the beam 1. The guide disks 8, on which the roll shell 5 is rotatably supported, permit movement of the roll shell 5 in the direction of pressure of the hydrostatic support elements 6, but prevent lateral movements. A roller provided with guide disks of this type is disclosed in U.S. Pat. No. 3,885,283 to Biondetti, to which reference is expressly made in this connection, so that a more detailed description will not be necessary.

A row of cylindrical bores 12 is formed in the beam and hydrostatic support elements 6 are carried therein. The cylindrical bores 12 are connected to a central bore 11 which is connected to a known supply line (not shown) of a hydraulic pressure medium. The hydraulic medium is conducted out of the intermediate space between the beam 1 and the shell 5 in a known manner (not shown), for example, by channels in the beam 1. Sealing plates 13 and 14 prevent escape of the hydraulic medium.

Figure 2:
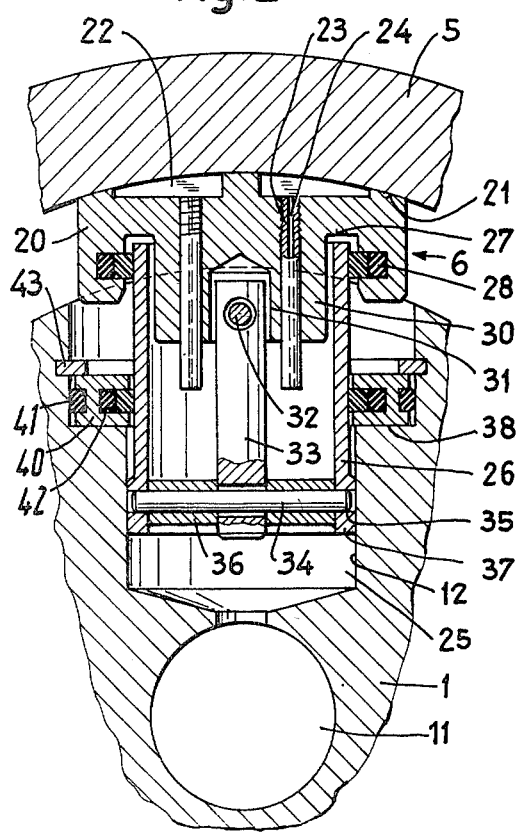
FIG. 2 is an enlarged sectional view taken along line II—II of FIG. 1 illustrating a section of a hydrostatic support element.

FIG. 2 is an enlarged illustration of the hydrostatic support element 6 in FIG. 1. The support element 6 comprises a support shoe 20 having a bearing surface 21 which cooperates with the inner surface of the roll shell 5. In the bearing surface hydraulic bearing pockets 22 are formed in a known manner. Small tubes 23 having throttle channels 24 lead from bearing pockets 22 into the pressure chamber 25 formed by the bore 12. In addition, the support element 6 contains a tube 26, which engages in a ring-shaped recess 27 in the support shoe 20. A seal 28 is provided between the outer surface of the tube 26 and the wall of the recess 27. The seal 28 comprises an inner sealing ring, which, for example, may consist of a synthetic material to facilitate sliding, and an outer pressure ring, which, for example, may consist of a rubber-like material.

As FIG. 2 further illustrates, inside recess 27 the support shoe 20 has a projection 30 within which there is an axially oriented concentric bore 31. The upper end of a connecting rod 33 is positioned within the concentric bore 31. The connecting rod 33 has a radial bore at either end thereof. The two radial bores are oriented advantageously perpendicular to each other. A first pin 32 is disposed within the upper radial bore of connecting rod 33 and within the projection 30 to pivotally connect the support shoe 20 with the connecting rod 33. A second pin 34 is disposed within the lower radial bore of connecting rod 33. Pin 34 is further supported in bores 35 of the tube 26 to pivotally connect the tube 26 with the connecting rod 33. Spacers 36 are provided at either side of connecting rod 33. This arrangement permits pivotal motion between the support shoe and the tube 26.

As further illustrated in FIG. 2, the end of the tube 26 remote from the shoe 20 is provided with a short projection 37, which has a slightly greater diameter than the rest of the tube 26. In the bore 12 of the beam 1 a radial step 38 is formed to which a sealing ring 40 with seals 41 and 42 is joined. The sealing ring 40 is held fast in the bore 12 by a spring washer 43, but is permitted to be slightly movable in said bore 12 in the radial direction, i.e., sideways.

Since the outside diameter of the projection 37 is only slightly greater, i.e., by a few tenths of a millimeter, than the outside diameter of the remaining portion of the tube, virtually equal compressive forces act on the two ends of the tube. Hence, tube 26 floats between the beam 1 and the shoe 20, so that the rod 33 has no or only minimal forces to bear. Centering of the tube 26 in relation to the shoe 20 takes place by means of the seal 28, slight deviations having no influence.

Figure 3:
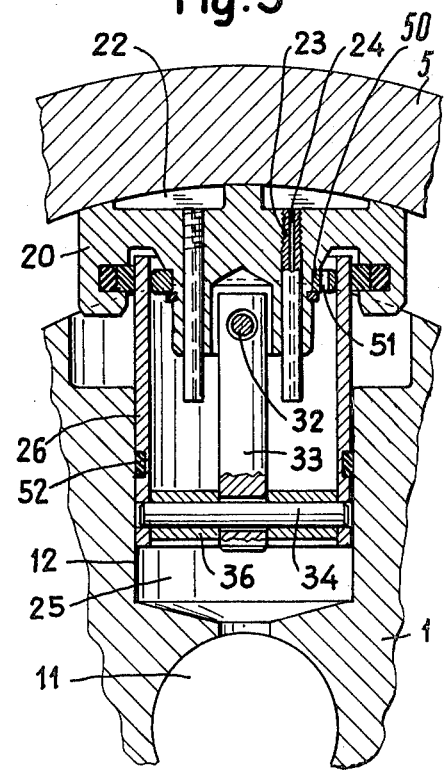
FIG. 3 illustrates an alternative embodiment of the hydrostatic support element of FIG. 2.

Referring to FIG. 3, wherein like reference characters indicate like parts as above, the embodiment differs from that of FIG. 2 chiefly in that a centering ring 50, having connecting apertures 51 is provided between the tube 26 and the shoe 20 to permit passage of the hydraulic pressure fluid. In this embodiment a seal 52 including a sealing ring is disposed in a groove in the tube 26. The groove may be produced, for example, in a hardened tube, simply by grinding.

Referring to FIG. 4, like reference characters indicate like parts as above. In the embodiment of FIG. 4 support shoe 20 is used which is essentially like the support shoe of the preceding embodiments. A tube 26, carried sealingly in a bore 12, engages in the support shoe 20.

In contrast to the preceding embodiments, the bore 12 is in this case somewhat shorter. Bore 12, however, is extended coaxially by a bore 60, which in the example illustrated crosses the axial bore 11.

Projecting element 61 is rigidly fixed in the tube 26. Through element 61 a rod 63 is passed which is fixed by a pin 62. At the end of the rod 63 remote from the supporting shoe 20 a guide member 64 is fixed, which is carried slidingly in the bore 60. For balancing the pressures at both sides of the guide member, at least one slot 65 is provided.

At the end of the rod 63 found inside the supporting shoe 20 a bushing 66 with spherical outer surface is fixed. The bushing is supported slidingly in a spherical bearing bushing, which is held in a central bore 68 of the support shoe 20 by a threaded bushing 70.

The mode of operation of the support element of FIG. 4 is the same as that of the elements of FIGS. 2 and 3. The hydraulic pressure fluid supplied through the bore 11 acts on the surface of the support shoe 20 through the tube 26 and presses the support shoe 20 against the inner surface of the roll shell 5, which in turn exerts a compressive force on an opposing roll, for example, the opposing roll 7 of FIG. 1.

In the embodiment of FIG. 4 a relatively great lifting movement of the support shoe 20 and of the tube 26 is possible. The necessary axial guidance of the tube 26 in its longitudinal direction is not accomplished by a corresponding length of entry into the bore 12, but specifically with the aid of the rod 63 and the bore 60. The bore 60 may therein have a relatively small diameter, so that it weakens the beam 1 less than a bore having the diameter of the bore 12.

Although support shoes with hydrostatic bearing pockets 22 and hydrostatic lubrication between the support shoe 20 and the shell 5 have been illustrated in all embodiments, simplified embodiments, in which the hydrostatic lubrication is omitted and replaced by hydrodynamic lubrication, are alternatively conceivable. In such case the bearing pockets 22 and the throttle channels 24 may be omitted. On the other hand, the support shoes 20 must be provided with tapered surfaces 71 as indicated in FIG. 4, which permit admission of the lubricating oil found in the intermediate space between the shell 5 and the beam 1 between the bearing surface 21 and the inner surface of the shell 5, so that a dynamic lubricating film may be formed. These tapered surfaces may otherwise be provided alternatively in hydrostatic lubrication.

I claim:

1. A deflection compensating press roll which comprises:
    (a) a stationary axial support beam having a central bore extending therethrough and having a plurality of generally radially extending cylinder bores in communicating relation with said central bore;
    (b) a roll shell rotatably disposed about said support beam for rotation thereabout; and
    (c) a plurality of hydrostatic support elements positioned in engaged relation between said beam and said shell to exert forces therebetween, at least one of said support elements including piston means which includes:
        i. a generally tubular member positioned within at least one of said radially extending cylinder bores for permitting the passage of pressure fluid to support said shell;
        ii. a support shoe positioned at least partially within said tubular member, said support shoe having at least one bearing surface portion adjacent the end portion of said tubular member closer to said roll shell, said bearing surface portion being fluidically connected with interior portions of said tubular member for the passage of pressure fluid thereto, and facing inner surface portions of said shell for support thereof; and
        iii. means for connecting said support shoe to said generally tubular member to provide pivotal motion for said support shoe while avoiding substantial blockage of the inner opening of said generally tubular member at the end portion thereof remote from said roll shell so as to permit pressure fluid to enter said generally tubular member.

2. The deflection compensating roll according to claim 1, wherein said tubular member is cylindrical and wherein said support shoe of said support element further comprises a pair of concentric projections defining an annular recess therebetween within which one end portion of said cylindrical tubular means is sealingly positioned.

3. The deflection compensating roll according to claim 2, further comprising a centering guide ring disposed in the annular recess about the inner concentric projection of said support shoe and within said cylindrical tubular member of said piston means for centering said support shoe in relation to said cylindrical tube, said guide ring having at least one aperture extending in a generally axial direction to provide passage therethrough of a hydraulic pressure medium.

4. The deflection compensating roll according to claim 2, wherein said cylindrical tubular member comprises an annular projection about one end portion thereof having a diameter at least slightly greater than the outside diameter of the major portion of said cylindrical tubular member.

5. The deflection compensating roll according to claim 3, wherein said cylindrical tubular member comprises an annular projection about one end portion thereof having a diameter at least slightly greater than the outside diameter of the major portion of said cylindrical tubular member.

6. The deflection compensating roll according to claim 2 wherein a sealing ring is disposed about said tubular member.

7. The deflection compensating roll according to claim 3 wherein a sealing ring is disposed about said tubular member.

8. The deflection compensating roll according to claim 1 wherein the means for connecting said support shoe and said generally tubular member comprises:
    a rod disposed axially within said generally tubular member; and
    at least two pivot pins disposed generally perpendicularly of said rod, said first pin pivotally connecting one end portion of said rod with said support shoe, said second pin pivotally connecting the other end portion of said rod with said generally tubular member.

9. The deflection compensating roll according to claim 1 wherein said support shoe includes at least one hydrostic bearing pocket.

10. The deflection compensating roll according to claim 9, further comprising at least one throttle channel for providing fluid communication between said piston means and said bearing pocket.

11. The deflection compensating roll according to claim 1 wherein the bearing surface of the support shoe is hydrodynamic.

12. A deflection compensating press roll which comprises:
    (a) a stationary axial support beam having a central bore extending therethrough and having a plurality of generally radially extending cylinder bores in communicating relation with said central bore;
    (b) a roll shell rotatably disposed about said support beam for rotation thereabout;
    (c) a plurality of hydrostatic support elements positioned in engaged relation between said beam and said shell to exert forces therebetween, at least one of said support elements including:
        i. a piston member including a generally tubular member disposed within at least one of said radially extending cylinder bores, said tubular member having substantially constant inner and outer diameters and a first end portion positioned within said cylinder bore remote from inner surface portions of the roll shell;

ii. a support shoe positioned at a second end portion of said piston member having a bearing surface facing inner surface portions of said roll shell and adapted to fluidically communicate said inner surface portions of said roll shell with said first end portion of said piston member;

iii. a generally elongated member disposed generally axially within said tubular member;

iv. means for pivotally connecting one end portion of said elongated member to said first end portion of said tubular member;

v. means for pivotally connecting said support shoe to the other end portion of said elongated member to provide pivotal motion of said support shoe relative to said elongated member along an axis generally perpendicular to the pivotal axis of said generally elongated member and said first end portion of said tubular member thereby providing relative pivotal motion between said support shoe and said tubular member and permitting fluidic pressure to act against the faces of said cylindrical tubular member and support shoe so as to transmit fluidic pressure support forces in a radial direction against the inner surface portions of said roll shell.

13. The deflection compensating roll according to claim 1 wherein said tubular member is a thin wall tube.

14. The deflection compensating roll according to claim 13 wherein said support shoe includes at least one hydraulic bearing pocket.

15. The deflection compensating roll according to claim 14, further comprising at least one throttling duct for providing fluid communication between said piston means and said bearing pocket.

16. The deflection compensating roll according to claim 15, further comprising at least two tubes disposed within said support shoe, each tube being positioned and having a throttle channel for providing fluid communication between said piston means and an associated bearing pocket.

17. A deflection compensating press roll which comprises:

(a) a stationary axial support beam having a central bore extending therethrough and having a plurality of generally radially extending cylinder bores in communicating relation with said central bore;

(b) a roll shell rotatably disposed about said support beam for rotation thereabout; and (c) a plurality of hydrostatic support elements positioned in engaged relation between said beam and said shell to exert forces therebetween, at least one of said support elements including piston means which includes:

i. a generally tubular member positioned within one of said radially extending cylinder bores for permitting the passage of pressure fluid to support said shell, said generally tubular member having substantially constant inner and outer diameters and a first end portion positioned within said cylinder bore remote from the inner surface portions of the roll shell;

ii. a support shoe having at least a portion thereof which is positioned at least partially within said tubular member and having at least one bearing surface portion adjacent the end portion of said tubular member closer to said roll shell, said bearing surface portion being fluidically connected with the interior portion of said tubular member for the passage of pressure fluid thereto, and facing inner surface portions of said roll shell for support thereof;

iii. a generally elongated rod disposed within, and generally axially of said tubular member;

iv. a first pivot pin pivotally connecting said support shoe to one end portion of said generally axially positioned rod;

v. a second pivot pin pivotally connecting the other end portion of said axially positioned rod to said generally tubular member and disposed in a direction generally perpendicular to said first pivot pin, said first and second pivotal connections supporting said support shoe and providing pivotal motion for said support shoe while avoiding substantial blockage of the inner opening of said generally tubular member at the end portion thereof remote from said roll shell so as to permit pressure fluid to enter said generally tubular member.

18. A deflection compensating press roll which comprises:

(a) a stationary support beam having a central bore extending therethrough and having a plurality of generally radially extending cylinder bores in communicating relation with said central bore, at least one cylinder bore communicating with an extension bore disposed in generally aligned relation with said cylinder bore and positioned on the side of the central bore opposite said cylinder bore;

(b) a roll shell rotatably disposed about said support beam for rotation thereabout; and (c) a plurality of hydrostatic support elements positioned in engaged relation between said beam and said shell to exert forces therebetween, at least one of said support elements including piston means which includes:

i. a generally tubular member positioned within at least one of said radially extending cylinder bores for permitting the passage of pressure fluid to support said shell;

ii. a support shoe positioned at least partially within said tubular member, said support shoe having at least one bearing surface portion adjacent the end portion of said tubular member closer to said roll shell, said bearing surface portion being fluidically connected with said central bore for the passage of pressure fluid thereto, and facing inner surface portions of said shell for support thereof;

iii. an elongated rod disposed generally axially of and connected to said generally tubular member;

iv. a guide member pivotally connected to the other end portion of said elongated rod, said guide member being slidably disposed within said extension bore, said pivotal connections supporting said support shoe and providing pivotal motion for said support shoe.

19. A deflection compensating press roll which comprises:

(a) a stationary axial support beam having a central bore extending therethrough and having a plurality of generally radially extending cylinder bores in communicating relation with said central bore;

(b) a roll shell rotatably disposed about said support beam for rotation thereabout; and (c) a plurality of hydrostatic support elements positioned in engaged relation between said bean and said shell to exert forces therebetween, at least one of said support elements including piston means which includes:
  i. a cylindrical tubular member disposed within each radially extending cylinder bore for transmitting fluidic pressure to support each shell;
  ii. a support shoe positioned at a first end portion of each piston means closer to said shell, each support shoe having a bearing surface which faces inner surface portions of said shell and further comprising a pair of concentric projections defining an annular recess therebetween, within which said first end portion of said cylindrical tubular member is sealingly positioned;
  iii. means for connecting said support shoe to said cylindrical tubular member while permitting passage of pressure fluid to said support shoe to provide forces for supporting said shell; and
  iv. a centering guide ring disposed within said annular recess about the inner concentric projection of said support shoe and within said cylindrical tubular member for centering about said support shoe in relation to said cylindrical tubular member, said guide ring having at least one axially extending aperture for the passage therethrough of a hydraulic pressure medium.

20. The deflection compensating roll according to claim 17, wherein said cylindrical tubular member comprises an annular projection about one end portion thereof having a diameter at least slightly greater than the outside diameter of the major portion of said cylindrical tubular member.

21. The deflection compensating roll according to claim 19, wherein a sealing ring is disposed about said tubular member.

* * * * *